United States Patent [19]  [11]  4,395,507
Dziark et al.  [45]  Jul. 26, 1983

[54] SELF-BONDING ONE-COMPONENT DIMEDONE RTV SILICONE RUBBER COMPOSITIONS

[75] Inventors: John J. Dziark, Ballston Spa, N.Y.; Kazuto Shinohara, Ohta, Japan

[73] Assignee: General Electric Silicones, Waterford, N.Y.

[21] Appl. No.: 331,232

[22] Filed: Dec. 16, 1981

[51] Int. Cl.³ .............................................. C08K 5/34
[52] U.S. Cl. ................................... 524/101; 523/212; 524/264; 524/265; 524/267; 524/588; 524/720; 524/730; 524/731; 524/773; 524/789; 524/860; 524/863; 524/431; 528/18; 528/34; 528/32; 428/447
[58] Field of Search ............... 524/101, 264, 265, 567, 524/588, 720, 730, 731, 773, 789, 860, 863, 431; 523/212; 528/18, 34, 32; 428/447

[56] References Cited

U.S. PATENT DOCUMENTS

| | | | |
|---|---|---|---|
| 2,938,009 | 5/1960 | Lucas | 523/212 |
| 3,004,859 | 10/1961 | Lichtenwalner | 106/308 Q |
| 3,296,161 | 1/1967 | Kulpa | 528/34 |
| 3,494,951 | 2/1970 | Berger | 556/420 |
| 3,517,001 | 6/1970 | Berger | 544/221 |
| 3,635,743 | 1/1972 | Smith | 106/288 Q |
| 3,896,123 | 7/1975 | DeZuba et al. | 544/219 |
| 4,100,129 | 7/1978 | Beers | 524/425 |
| 4,176,111 | 11/1979 | Cella | 524/863 |
| 4,176,112 | 11/1979 | Cella et al. | 524/863 |
| 4,223,122 | 9/1980 | Cella | 528/30 |
| 4,238,401 | 12/1980 | Cella et al. | 556/436 |
| 4,257,932 | 3/1981 | Beers | 524/588 |
| 4,273,698 | 6/1981 | Smith, Jr. et al. | 524/263 |
| 4,308,372 | 12/1981 | Smith, Jr. et al. | 528/34 |

Primary Examiner—Melvyn I. Marquis

[57] ABSTRACT

The present invention relates to dimedone functional self-bonding room temperature vulcanizable silicone rubber compositions. The self-bond additive is selected from silyl maleates, silyl fumarates, silyl succinates, silyl isocyanurates and mixtures thereof. Preferably the self-bonding additive is prereacted with the cross-linking agent before they are incorporated into the RTV composition. This prereaction of the self-bonding additive and the cross-linking agent imparts shelf-stability to the composition.

110 Claims, No Drawings

SELF-BONDING ONE-COMPONENT DIMEDONE RTV SILICONE RUBBER COMPOSITIONS

BACKGROUND OF THE INVENTION

The present invention relates to room temperature vulcanizable silicone rubber compositions and more particularly the present invention relates to self-bonding RTV silicone rubber compositions.

RTV silicone rubber compositions have been known for some time (RTV stands for Room Temperature Vulcanizable). An early type of one-component RTV silicone rubber composition has as its basic ingredients, a silanol terminated diorganopolysiloxane polymer, and acyloxy functional silane cross-linking agent and a metal salt of a carboxylic acid as a curing promoter. The composition may also contain other additives which may modify or vary the properties of the uncured and cured composition as desired. An example of such additives are fillers, heat stabilizers, flame retardant additives, etc.

One especially useful additive for such compositions was a self-bonding additive. The self-bonding additive permitted the silicone composition to be applied to substrates without the use of a primer and the composition would cure to a silicone elastomer with good self-bonding properties to the underlying substrate; that is, in most cases, the composition would rupture rather than the bond rupturing first. This is referred to as cohesive failure versus adhesive failure.

Accordingly, it was highly desirable to have a self-bonding one-component RTV composition which would result in cohesive failure of the composition rather than adhesive failure since that would mean that the composition would rupture before the bond between the composition and the substrate ruptured. One example of such a self-bonding additive is for instance to be found disclosed in Kulpa U.S. Pat. No. 3,296,161 which is hereby incorporated by reference. This patent discloses diacyloxydialkoxy silanes as self-bonding additives for acyloxy functional one-component RTV compositions.

The advantage of such self-bonding additives is obvious; that is they eliminate the need for a primer and thus they eliminate additional steps in applying the composition. This is especially desirable since the elimination of an additional step of applying the composition decreases the labor costs and thus decreases the over-all costs of utilizing the composition. Such self-bonding additives as disclosed in the Kulpa patent resulted in acyloxy functional compositions having self-bonding properties with cohesive failure to various types of substrates, and particularly to glass, ceramic, plastic and metallic substrates. Such self-bonding additives also gave good self-bonding properties to masonry substrates such as concrete, although the compositions in general do not tend to adhere as well to concrete substrates as they adhere to other types of substrates.

One-component RTV compositions with various types of functional cross-linking agents such as amine cross-linking agents, ketoxime cross-linking agents, amide cross-lining agents, etc., as well as acyloxy functional cross-linking agents are known. One new development in this area was the development of acyloxy functional cross-linking agents in which the acyloxy group has from 5-30 carbon atoms and was most preferably 2-ethylhexanoyloxy; a preferable cross-linking agent being methyl tris(2-ethylhexanoyloxy)silane.

Such RTVs were desirable in that they did not give off as pungent an odor as the lower acyloxy functional RTVs and are not as corrosive. The lower acyloxy functional RTVs have as their basic cross-linking agent methyltriacetoxy silane which upon cure of the composition releases acetic acid which has a pungent odor and tends to be corrosive. Accordingly, for the above reasons the 2-ethylhexanoyloxy silane functional RTV's were desirable. However, it was necessary to develop self-bonding additives for such compositions since the traditional self-bonding additives were not altogether satisfactory.

An example of self-bonding additives for such compositions, is for instance to be found disclosed in Mitchell, et al U.S. Pat. No. 4,273,648 which is hereby incorporated by reference. This patent discloses silyl maleates, fumarates, succinates and discloses maleate functional polysiloxanes, fumarate functional polysiloxanes, and succinate functional polysiloxanes as self-bonding additives for such acyloxy functional one-component RTV compositions. However, it was found that such compositions did not have good shelf stability. Accordingly, one method of improving the shelf stability of such compositions was to pre-react the 2-ethylhexanoyloxy functional silane cross-linking agent with the self-bonding additives before it was incorporated into the composition. By such pre-reaction, it was found that the composition had good self-bonding properties as well as good shelf stability. An example of the disclosure of such pre-reaction to enhance shelf stability is to be found in the Dziark et al Ser. No. 52,042.

An example of another self-bonding additive that may be utilized in such compositions is the silyl isocyanurates of Beers U.S. Pat. No. 4,257,932. Such silyl isocyanurates are also desirable self-bonding additives for alkoxy functional one-component RTV systems as can be noted from the disclosure of Beers, U.S. Pat. No. 4,100,129 which is incorporated by reference.

These self-bonding additives work very well for the systems for which they were designed. However, there is continuing work being done in developing new and novel RTV systems so as to gain various advantages over prior RTV systems. One is the development of novel dimedone functional one-component RTV systems, as for instance, can be seen from the disclosure of Cella U.S. Pat. No. 4,223,122, Cella U.S. Pat. No. 4,176,111, Cella U.S. Pat. No. 4,176,112 and Cella U.S. Pat. No. 4,238,401. These patents disclose various types of dimedone functional RTV systems. The advantage of such dimedone systems is that they are non-corrosive and cure very quickly as well as having no unpleasant odor. However, it was found that such dimedone RTV systems had very poor bonding properties to substrates such as metallic substrates, plastic substrates, glass substrates and masonry substrates without the use of primers. Accordingly, it became highly desirable to develop self-bonding additives or adhesion promoters for such compositions. One example of such self-bonding additives is the dialkoxydi-dimedone functional silane adhesion promoters of Lampe et al, Docket 60-SI-347 which is filed on the same date as the present case. This patent application discloses that the traditional adhesion promoters which were utilized with acyloxy functional RTV's were found not to be especially desirable for dimedone functional RTV systems. Accordingly, the self-bonding additive of that disclosure was developed and utilized with dimedone systems so as to give the dimedone functional RTV systems good self-bonding properties to various substrates. Thus unexpectedly it has been found that when certain self-bonding additives are utilized in higher concentrations than was previously utilized for one-component RTV acyloxy functional RTV systems, that these adhesion promoters give good self-bonding properties to the known dimedone functional RTV systems.

Accordingly, it is one object of the present invention to provide for adhesion promoters for dimedone functional RTV systems.

It is an additional object of the present invention to provide silyl maleates, silyl fumarates, silyl succinates and silyl isocyanurates self-bonding additives for dimedone functional RTV systems.

It is still an additional object of the present invention to utilize silyl maleates, silyl fumarates, silyl succinates and silyl isocyanurates at higher levels of concentration than previously used so that such adhesion promoters will function effectively as self-bonding additives in dimedone functional RTV systems.

It is yet an additional object of the present invention to provide for a pre-reacted adhesion promoter, cross-linking agent mixture in a dimedone one-component RTV system with good shelf stability.

It is yet an additional object of the present invention to provide a process for producing a shelf-stable dimedone functional RTV system which is self-bonding.

These and other objects of the present invention are accomplished by means of the disclosure set forth herein below.

SUMMARY OF THE INVENTION

In accordance with the above objects, there is provided by the present invention a self-bonding one-component RTV silicone composition comprising (A) 100 parts by weight of a silanol end-stopped polymer of the formula,

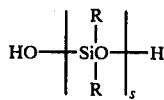
(1)

where s varies such that the viscosity of the polymer varies from 100 to 1,000,000 centipoise at 25° C. and the reaction product of (B) from 0.1 to 10 parts by weight of the silyl ether cross-linking agent of the formula,

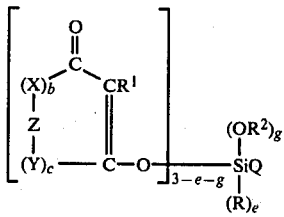
(2)

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; and (C) from 3 to 8 parts by weight of an adhesion promoter selected from the class consisting of silyl maleates, silyl fumarates, silyl succinates and silyl isocyanurates.

In another embodiment of the present invention there is provided by the present invention a self-bonding dimedone functional one-component RTV silicone rubber composition comprising (A) 100 parts by weight of a silanol end-stopped polymer of the formula,

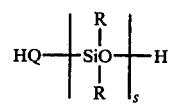
(3)

where s varies such that the viscosity of the polymer varies from 100 to 1,000,000 centipoise at 25° C. and the reaction product of (B) from 0.1 to 10 parts by weight of silyl ether cross-linking agent of the formula,

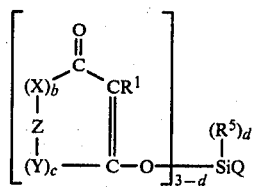
(4)

where Q is a hydrolyzable radical, R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 3 to 8 parts by weight of an adhesion promoter selected from the class consisting of silyl maleates, silyl fumarates, silyl succinates, and silyl isocyanurates.

It should be noted that the difference between the first embodiment and the second embodiment is in the dimedone functional cross-linking agent. In one dimedone functional cross-linking agent there is an alkoxy group and in the second dimedone functional RTV RTV ingredient there is a monovalent hydrocarbon radical appended to the terminal silicon atom which in the broadest generic embodiment of the invention can have anywhere from 1–13 carbon atoms. More preferably, this $R^5$ radical has from 4–12 carbon atoms. The reason for the more preferred carbon atoms in the $R^5$ radical is that this slows down the cure so that the composition has the appropriate amount of work life. This can also be accomplished by substituting for the $R^5$ radical an alkoxy group. The most preferred embodiment is that the $R^5$ radical be an alkyl group of 4–12 carbon atoms. Preferably, the cross-linking agent is pre-reacted with the adhesion promoter. The adhesion promoter being selected from silyl maleates, silyl fumarates, silyl succinates and isocyanurates. Generally the adhesion promoter may be pre-reacted with a cross-linking agent at anywhere from room temperature to 120° C. and more preferably from 40°–120° C. for periods of time which depend on the temperature. Generally for a temperature range of 40° to 120° C. the time of heating may be anywhere from 7 to 10 days to two hours. When the higher temperature is used at 120° C., 2 hours heating time is sufficient. More preferably the composition is pre-reacted at a temperature of anywhere to 50°–100° C. for a period of time varying anywhere from 7 days for 2–4 hours. Commercially it is desirable that the composition be heated at a temperature of 80°–100° C. for 2–6 hours since this allows the composito be processed at a rapid rate. However, if it is desired to age the pre-reacted composition at lower temperatures and time is no factor, this can also be done. Such pre-reaction of the catalyst with the cross-linking agent results in the composition having shelf stable properties. That is, its cured properties will not degrade after it has been stored for periods of time as much as six months to a year or more. Without such pre-reaction then the shelf stability dramatically decreases after periods of six months and especially after periods of one year after manufacture.

DESCRIPTION OF THE PREFERRED EMBODIMENT

What is claimed in the present invention is a self-bonding dimedone functional RTV composition. In one aspect the invention comprises (A) 100 parts by weight of an organopolysiloxane consisting essentially of chemically combined units of the formula,

         (5)

and having terminal alkoxysiloxy units of the formula,

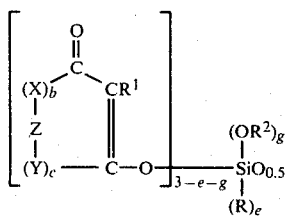         (6)

where R is a $C_{(1-13)}$ monovalent organic radical, $R^1$ is selected from hydrogen, halogen and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; (B) from 3 to 8 parts by weight of an adhesion promoter which is selected from the class consisting of silyl maleates, silyl fumarates, silyl succinates, silyl isocyanurates and mixtures thereof.

In another aspect of the present invention there comprises a self-bonding one-component RTV silicone rubber composition comprising (A) 100 parts by weight of a silanol end-stopped polymer of the formula,

         (7)

where S varies such that the viscosity of the polymer varies from 100 to 1,000,000 centipoise at 25° C. and the reaction product of (B) from 0.1 to 10 parts by weight of silyl ether cross-linking agent of the formula,

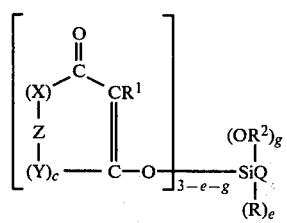         (8)

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; and (C) from 3 to 8 parts by weight of an adhesion promoter selected from the class consisting of silyl maleates, silyl fumarates, silyl succinates and silyl isocyanurates.

It should be noted that the difference between the invention as disclosed in the prior disclosure and in terms of the latter disclosure is the form of the composition. In the latter aspect of this invention the composition comprises a mixture of a silanol polymer, a dimedone functional silane cross-linking agent and an adhesion promoter. In the former disclosure of the invention, the invention is disclosed in terms of the most prevalent polymer that is formed from a mixture of a silanol terminated diorganopolysiloxane polymer of formula (7) above and the dimedone functional cross-linking agent. It should be noted that not all of the polymer that is formed from the silanol polymer of Formula (7) and the cross-linking agent of formula (8) will be the former polymer of Formulas (5) and (6). There will be some other types of polymers that will be formed which result from the self-bonding additive reacting with the terminal groups of the polymer and also there will be other groups in the composition depending on whether a curing promoter is included and whether other additives are added to the composition. However, basically the most prevalent polymer that is formed from a mixture of the silanol polymer of Formula (7) and the cross-linking agent of Formula (8) will be the polymer of Formula (5) and (6).

It should be noted that the cross-linking agent of Formula (8) contains an alkoxy group. This permits the polymer that is formed from the cross-linking agent and the silanol polymer to have a terminal alkoxy group which slows down the cure of the composition so that the composition has desirable work life. Accordingly, this is one aspect of the desirable dimedone functional RTV compositions of the instant case.

The cross-linking agents of Formula (8) above can be made by effecting reaction under substantially anhydrous conditions between aliphatic alcohol of the formula, $R^2OH$, and an organohalosilane of the formula $(R)_d SiD_{4-d}$ where R, $R^2$ are as previously defined and d rades from 1 to 3 and D is a halogen radical, and a cyclic 1,3-dicarbonyl compound of the formula,

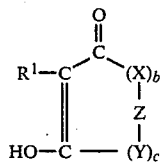

in the presence of a base catalyst where $R^1$, X, Y, Z, b and c are as previously defined.

For more information as to the production of such dimedone cross-linking agents and their use to produce dimedone functional one-component RTV systems, one is referred to the disclosure of U.S. Pat. No. 4,238,401 and U.S. Pat. No. 4,176,112 which are hereby incorporated by reference. More information will not be given as to this preparation since the worker skilled in the art can refer to formation of such dimedone functional RTV's.

With such dimedone functional compositions there may be incorporated into 100 parts of the base silanol polymer of Formula (7) or the base polymer of Formula (5) and (6) from 0.01 to 10 parts by weight of a curing promoter which is a metal salt of a carboxylic acid. Preferably the metal salt of carboxylic acid is utilized if the composition is to have the proper curing properties, that is, cure at a sufficiently fast rate. Preferably the curing promoter is a tin salt.

Another type of tin compound that can be utilized with some effect is dibutyl-tin-diacetate. Most any type of tin compound may be utilized.

In addition to the other foregoing there may be incorporated into the composition from 10 to 200 parts by weight of a filler per 100 parts of silanol polymer or the base polymer of Formulas (5) and (6). The filler can be partially or totally any selected from reinforcing fillers such as fumed silica and precipitated silica and can also be selected from extending fillers such as calcium carbonate, zinc oxide, iron oxide, lithopone, silica aerogel, crushed quartz, etc.

If the filler is a reinforcing filler preferably it is treated with various agents as specifically cyclopolysiloxanes as disclosed in Lucas U.S. Pat. No. 2,938,009 and Lichtenwalner U.S. Pat. No. 3,004,859 and/or silazanes as disclosed in Smith U.S. Pat. No. 3,635,743.

Preferably, the fillers are reinforcing fillers which are treated with a cyclopolysiloxane and/or silazanes. The reason for this is the treated filler imputs to the cured silicone elastomeric composition the desired physical properties, that is, high tensile strength, good elongation, and high tear without unduly increasing the uncured viscosity of the composition.

On the other hand, untreated reinforcing filler, which increasing the physical properties of the composition nevertheless tends to unduly increase the uncured viscosity of the composition making the composition somewhat difficult to apply. However, if this is not a problem then the untreated filler may be utilized as desired.

Per 100 parts by weight of the silanol polymer there may also be utilized from 0-40 parts by weight of a plasticizer which is a diorganopolysiloxane polymer of a viscosity varying from 10-20,000 centipoise at 25° C. and the organo group is $C_{(1-8)}$ monovalent hydrocarbon radical. The plasticizer also prevents the composition from unduly increasing its viscosity in the uncured state and also increases the percent elongation of the cured composition and makes it more plastic. Such a plasticizer is especially desirable if the composition is to be low modulus. There may also be utilized in the composition from 1 to 20 parts by weight of another plasticizer and adhesion promoter which is silanol containing diorganopolysiloxane with a viscosity range of 10-1000 centipoise at 25° C. where the organo group is a $C_{(1-8)}$ monovalent hydrocarbon radical and the silanol content varies from 3 to 10% by weight.

Such a plasticizer and adhesion promoter is an additional promoter over the basic adhesion promoters of the instant case and helps to slightly increase the adhesion properties of the composition. However, it is far outperformed as the basic adhesion promoter of the composition. The previous maleates, fumarates, succinates and isocyanurates are the basic adhesion promoters of the instant composition.

The linear diorganopolysiloxane polymer can be produced by the method well known in the art. The silanol contained diorganopolysiloxane plasticizer with a viscosity varying in the range of 10–1000 centipoise at 25° C. can be produced by the hydrolysis of the appropriate diorganodichlorosilanes and purification thereof.

There may also be incorporated into the composition 100 parts of the silanol polymer over the base polymer of Formula (5) and (6) from 1 to 100 parts of a thermal stabilizer which is preferably an iron oxide as disclosed in U.S. Pat. No. 4,257,932 which is hereby incorporated by reference.

These are just some of the additives which may be utilized in the instant composition. Other additives which are deemed appropriate can be added to the composition for various reasons—that is for flame retardance, for enhancing physical properties, for plasticizing the composition, etc. as is well known in the art. The above additives that were disclosed are just for the production of a low modulus thermal stable composition and may be varied as desired. What is necessary in the instant composition is the dimedone functional composition which is a silanol polymer, a dimedone functional cross-linking agent, as disclosed above and the adhesion promoter that is the silyl maleate, fumarate, succinate and isocyanurate. The other type of dimedone functional RTV system is for instance comprised of 100 parts by weight of an organosiloxane having (A) 100 parts by weight of an organopolysiloxane consisting essentially of chemically combined units of the formula,

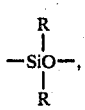   (9)

and having terminal siloxy units of the formula,

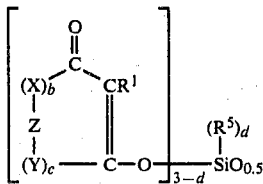   (10)

where R is a $C_{(1-13)}$ monovalent organic radical, $R^1$ is selected from hydrogen, halogen and R, X and Y are divalent radicals selected from —O—, —S— and

Z is a divalent $C_{(1-13)}$, organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical, and (B) from 3 to 8 parts by weight an adhesion promoter selected from a class consisting of silyl maleates, silyl fumarates, silyl succinates and silyl isocyanurates.

The above discloses the basic dimedone functional RTV polymer that is most prevalent in the composition as with the previous dimedone composition. The above dimedone functional RTV compositions of Formula (9) and (10) can also be claimed in terms of the ingredients that form it, having (A) 100 parts by weight of a silanol end-stopped polymer of the formula,

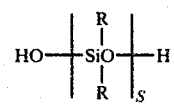   (11)

where s varies such that the viscosity of the polymer varies from 100 to 1,000,000 centipoise at 25° C. with the reaction product of (B) from 0.1 to 10 parts by weight of a silyl ether cross-linking agent of the formula,

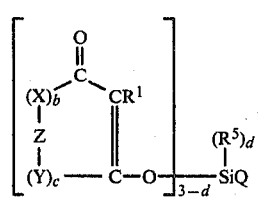   (12)

where Q is a hydrolyzable radical, R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 3 to 8 parts by weight of an adhesion promoter selected from the class consisting of silyl maleates, silyl fumarates, silyl succinates and silyl isocyanurates. The radical Q in Formulas (10), (12) and (2), (4), (6) and (8) may be any hydrolyzable radical such as halogen, alkoxy, etc.

Again, as stated previously the former dimedone composition is disclosed and claimed in this case in terms of the most prevalent polymer formed by reacting a silanol polymer of Formula (11) with a dimedone functional cross-linking agent of Formula (12). It should be noted that this dimedone functional composition differs from the earlier dimedone functional RTV composition disclosed previously in that it does not have an alkoxy group. The composition as disclosed above is the general dimedone functional RTV composition and has been found as an alternative to slowing down the cure of the composition by incorporating an alkoxy group in the cross-linking agent. In the dimedone cross-linking agent of Formula (12) above $R^5$ may be a $C_{(4-12)}$ alkyl radical. For example, the $R^5$ can be a dodecyl radical. Such a composition has been found to have the appropriate cure properties. That is, the cure is slowed down to a sufficiently slow rate, where one hydrocarbon substitutent group on the terminal silicone atoms of the polymer has 4–12 carbon atoms. However, if it is not desired to slow down the cure, then generally the composition need not have such a high carbon atom substituent group and it need not have an alkoxy group for the same reason. Such a cross-linking agent of Formula (12) above can be produced by a reaction between organohalosilane of the Formula $(R)_aSiD_{4-a}$ and a 1,3 dione of the formula

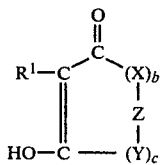

in the presence of an acid acceptor, where R, $R^1$, X, Z, Y, b and c are as previously defined and D is a halogen radical such as chloro and a varies from 1 to 3. For more details as to the production of such polymers one is referred to the disclosures of U.S. Pat. Nos. 4,176,111 and 4,223,122 which are hereby incorporated by reference. Please note that the previous dimedone functional RTV composition have the alkoxy functional cross-linking agent in Formula (8) and in the present dimedone functional RTV composition having the dimedone functional cross-linking agent of Formula (12) the composition can have 3,3,3 trifluoropropyl substituting group in it. That is basically one of the substituent groups in the cross-linking agent of Formula (8) and (12) and in both cases the silanol polymers of Formulas (7) and (11) can be selected from a mixture of $C_{(1-8)}$ monovalent hydrocarbon radicals preferably $C_{(1-8)}$ alkyl radicals and 3,3,3 trifluoropropyl radicals. For more information on specific compositions one can refer to the foregoing dimedone functional RTV patents.

In the foregoing formulas R can be any monovalent hydrocarbon radical such as alkyl radical, cycloalkyl radical, mononuclear aryl radical, alkenyl radicals and fluoroalkyl radicals of 1–12 carbon atoms. The divalent hydrocarbon radicals such as Z as defined in the foregoing claims may have anywhere from 1–13 carbon atoms and for more definitions of the radicals in addition to the above description one is referred to the foregoing dimedone patents. Suffice it to say that R in the foregoing formulas may be selected from alkyl radicals of 1–8 carbon atoms, such as methyl, ethyl, propyl; cycloalkyl radicals such as cyclohexyl, cycloheptyl, cyclooctyl; mononuclear aryl radicals such as methylphenyl, ethylphenyl, phenyl, etc.; alkenyl radicals such as vinyl, alkenyl, etc., and fluoroalkyl radicals of 3–8 carbon atoms, 3,3,3 trifluoropropyl. Most preferably in one embodiment of the present invention the R radical is selected from alkyl radicals, such as methyl, ethyl, propyl and fluoroalkyl radicals such as 3,3,3 trifluoropropyl. Preferably, the R radical is selected from a mixture of alkyl radicals such as methyl ethyl propyl, etc. and fluoroalkyl radicals such as 3,3,3 trifluoropropyl and are the preferred radicals in the silanol terminated polysiloxane polymers of Formula (7) and Formula (11).

The dimedone functional compositions are defined sufficiently in the above patents and for more information as to such dimedone functional compositions the worker skilled in the art is referred to the foregoing patents, which are hereby incorporated by reference.

Again, the latter dimedone functional composition may contain a curing promoter in the same concentration as 0.01–10 parts by weight of a curing promoter to 100 parts of the base silanol polymer. The curing promoter may be a tin salt and the tin salt is dibutyltindiacetate. The composition may also contain one of the foregoing fillers defined above or any other type of filler in the foregoing concentration disclosed previously or other concentrations as desired and may contain one of the foregoing plasticizers as indicated for the previous composition at the same concentrations. The dimedone functional composition of Formulas (9) and (10) or as defined in terms of the silanol polymer Formula (11) mixed with a cross-linking agent of Formula (12) may have the same additives, at the same concentrations as the previous dimedone functional RTV composition, which were disclosed previously.

The composition is preferably utilized to make laminates, such as gaskets between metallic substrates. Thus the composition of the instant case may be utilized to form sealants, glazing sealants and gasketing sealants for various uses and especially for automotive gasketing applications. Accordingly, the present self-bonding composition will adhere with good adhesion to some metallic substrates, some plastic substrates, some cellulosic substrates, some glass substrates, and some ceramic substrates. However the composition of the instant case finds most use in being adhered to metallic substrates, such as aluminum and stainless steel and is self-bonding with good adhesion properties to those substrates.

The composition of the instant case will normally be packaged in a single package and when it is desired to apply the composition the seal on the package is broken and the composition applied to form the gasket or whatever configuration is desired as a layer between metallic substrates or on top of a metallic substrate as a layer, and it will cure at room temperature to form a silicone elastomer, with cure taking place anywhere from 24–72 hours. It should be noted that for a good tight final cure, it is necessary that a promoter be present and this is especially true so as to enhance the shelf stability of the composition. It should also be appreciated that such compositions are normally packaged in anhydrous state in the absence of moisture and then when the seal on the package is broken the cross-linker hydrolyzes to cross-link the composition to a silicone elastomer with final cure taking place in the foregoing time period. As stated previously the instant composition is faster curing than previous one-component RTV compositions. However, a curing promoter is desired so that a maximum cure is obtained and so that the composition has good shelf stability after manufacture. That is it will cure to a final tight cure even after periods of time, as long as 1 to 2 years after manufacture.

The other ingredient in instant composition is the self-bonding additive and this is the novel ingredient in the dimedone functional composition of the instant case. Self-bonding additive may be selected from silyl maleates, fumarates, succinates and silyl isocyanurates, and silyl cyanurates. Examples of such additives are disclosed in Dziark et al, which is hereby incorporated by reference and Mitchell et al U.S. Pat. No. 4,273,648 which are hereby incorporated by reference, as well as in U.S. Pat. No. 4,100,129 and Berger U.S. Pat. No. 3,494,951 which are hereby incorporated by reference.

Generally the preferred self-bonding adhesion promoters which will work are for instance, those disclosed by the formula

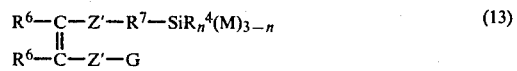 (13)

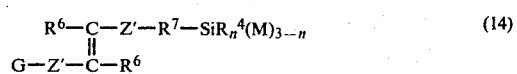 (14)

and

-continued

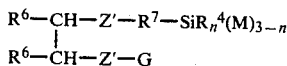

where Z' is selected from

phenylene,

CONH and $CONR_2^4$, G is selected from the class consisting of hydrogen, R', $R^7SiR_n^4(M)_{3-n}$ where R' is selected from monovalent hydrocarbon radicals and halogenated monovalent hydrocarbon radicals, R radicals and $R^7$ is a divalent hydrocarbon radical, $R^4$ is selected from monovalent hydrocarbon radicals and halogenated monovalent hydrocarbon radicals, M is selected from $R^5O$ and

radicals, $R^5$ is selected from monovalent hydrocarbon radicals and halogenated monovalent hydrocarbon radicals, $R^6$ is selected from hydrogen, and alkyl radicals of up to 10 carbon atoms and n is a whole number that varies from 1 to 3, R is as previously defined; and self-bonding polysiloxane additives selected from the group consisting of the formulas,

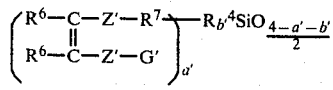

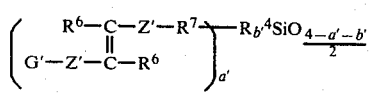

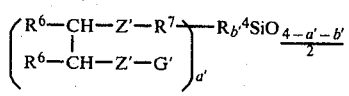

where G' is selected from the class consisting of hydrogen, R' and $R^7H_cR_d^4SiO_{(3-c-d/2)}$ and where Z', R', $R^7$, $R^4$ and R are as previously defined, a' varies from 0.005 to 2.0, b' varies from 1.0 to 2.5, the sum of a'+b' varies from 1.005 to 3.0, c varies from 0 to 1.0, d varies from 1.0 to 2.0, and the sum of c+d varies from 1.0 to 2.5. It should be noted that only the silyl isocyanurates, silyl cyanurates, silyl maleates, silyl fumarates and silyl succinates disclosed above will work as adhesion promoters in compositions of the present case since only such compounds are soluble with the components of one-component room temperature vulcanizable silicone rubber composition of the present case. It should be noted that within the above description there is included not only silyl maleates in which there is one silicone atom in the maleate, fumarate and succinate, but there is also included polysiloxane maleates and polysiloxane fumarates and succinates.

With respect to the silyl isocyanurates, suitable compounds are those of the formula

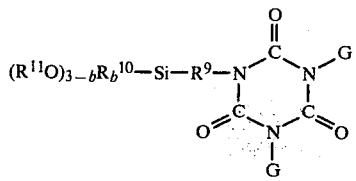

wherein G is a $(R^{11}O)_{3-b}R_b^{10}$-Si-$R^9$ radical, styryl, vinyl, allyl, chloroallyl or cyclohexenyl radical or a $R^{10}$ radical, as hereinafter defined; $R^9$ is a divalent radical selected rom alkylenearylene, alkylene, cycloalkylene and halo-substituted such divalent radicals; $R^{10}$ is a radical of up to 8 carbon atoms selected from hydrocarbyl or halohydrocarbyl and $R^{11}$ is a radical of the type defined for $R^{10}$ and also cyano lower alkyl; and b is 0 to 3.

Such adhesion promoters are disclosed in Berger, U.S. Pat. No. 3,517,001, which is incorporated herein by reference. The preferred such promoters are 1,3,5-tris(3-trimethoxysilylpropyl)isocyanurate and bis-1,3-(trimethoxysilylpropyl)isocyanurate, the former being most preferred.

For further reference to silyl isocyanurate adhesion promoters, which may be utilized in the instant invention, one is referred to the patent application of Dale Beers Ser. No. 919,544, filed on June 27, 1978, which is hereby incorporated by reference and Berger U.S. Pat. No. 3,517,001 which is also incorporated by reference into the present case.

For silyl cyanurates reference is made to U.S. Pat. No. 3,896,123 which is incorporated into the instant case by reference. The silyl cyanurate has the formula,

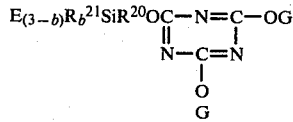

In the above formulas, $R^{22}$ is selected from unsaturated monovalent hydrocarbon radicals and unsaturated halogenated monovalent hydrocarbon radicals. G is selected from $R^{22}$ radicals, and radicals of the formula,

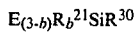

where E is selected from $R^{23}O$ radicals and $R^{23}COO$ radicals, where $R^{21}$ and $R^{23}$ are selected from monovalent hydrocarbon radicals and halogenated monovalent hydrocarbon radicals, $R^{20}$ is selected from divalent hydrocarbon radicals and halogenated divalent hydrocarbon radicals and b is a whole number equal to 0 to 3, inclusive. For further reference as to this type of adhesion promoter and the process by which it is made, one is referred to U.S. Pat. No. 3,896,123 which is hereby incorporated by reference.

For more information as to the preparation and manufacture of such silyl maleates, fumarates, succinates, isocyanurates and cyanurates, one is referred to the foregoing patents and patent applications. It should be noted that in the foregoing claims the term silyl isocyanurates stands for both the silanes and polysiloxanes, and the term silyl maleates, silyl fumarates, silyl succinates stand for both the silanes and polysiloxanes containing the foregoing functionality. That is, the expression of silyl stands for both silanes and polysiloxanes containing the foregoing functionality of fumarates, maleates, succinates, isocyanurates and cyanurates. The preparation of these compounds is disclosed in the foregoing patents and patent applications as disclosed previously and more detail will not be given herein.

In one embodiment of this present invention such adhesion promoters are disclosed as being added to the base polymer at a concentration of 3–8 parts without other preparation. In a more preferred embodiment of the instant case, the cross-linking agents are pre-reacted with the preferred adhesion promoters of the instant case. The reason that it is desired to pre-react the adhesion promoter with the cross-linking agent is that the composition maintains its shelf stability if it is pre-reacted; that is, if the adhesion promoter is not pre-reacted with the cross-linking agent, then after being stored for periods of time from 6 months to a year or more after manufacture, the composition does not cure to maximum physical properties. The physical properties degrade after a period of time after being stored after manufacture and before use. Such period of time being anywhere from 6 months to a year or more.

Accordingly, it is desired that the composition have shelf stability and in order to accomplish this it is desirable and preferable in the instant case that in both types of dimedone functional RTV composition disclosed above that the cross-linking agent be pre-reacted with the adhesion promoter whether the adhesion promoter be a silylmaleate, fumarate, succinate or silyl isocyanurate or silly cyanurate. This is accomplished by first premixing the adhesion promoter with the cross-linking agent and allowing the mixture to stand for, in one case, 30 days at room temperature. In another extreme case, the composition can be heated to 120° C. for 1–2 hours where the desired reaction will have taken place. It is not desirable to heat the composition at the higher temperatures above 120° C. since the dimedone functional cross-linking agent may be degraded. On the other hand, at temperatures below room temperature, the pre-reaction takes place too slowly.

A more practical range of heating the premixed mixture is at temperatures from 40°–120° C. for times varying from 2–4 hours for 7–10 days. More preferably, the mixture is heated at temperatures of 50°–100° C. for a period of time ranging from 2–4 hours to 7 days. More preferably, the mixture is heated at the temperature of 80°–100° C. for a period of time varying from 2–6 hours. Any of these temperature ranges and heating levels can be taken as is desired, whatever seems appropriate to the particular manufacturing constraints.

It should be noted that the cross-linking agent may be pre-reacted with the adhesion promoter with or without the curing promoter, that is, the metal salt of a carboxylic acid which is preferably a tin salt of a carboxylic acid.

The curing promoter does not have to be pre-reacted into the mixture; however, if it is desired to pre-react it for ease in manufacture, this can be done. All that is necessary in the instant invention to increase the shelf stability of the instant composition is to pre-react the adhesion promoter with the dimedone functional cross-linking agent.

After the pre-reaction of the catalyst composition, it may then mix anhydrously to the basic silanol polymer and other additives and packaged in a substantially anhydrous state and stored as such until it is ready to be utilized. It should be noted that the foregoing reaction can take place under atmospheric pressure or at elevated pressures, the pressure of the pre-reaction not being a factor. Accordingly, preferably the cross-linking agents react with the adhesion promoter and then the mixture is utilized in the instant composition to prepare a self-bonding dimedone functional RTV composition. It has been found that with such pre-reacted materials that the composition has good self-bonding properties and good shelf stability. The composition as stored in the anhydrous state will have good shelf stability for a year or two or more, and its final true properties will not degrade upon being stored for those periods of time.

The composition as stated previously is packaged in substantially an anhydrous state and stored as such. When it is desired to cure the composition, the seal on the package is broken and the composition will cure to a silicone elastomer upon its being exposed to atmospheric moisture with final cure taking place in anywhere from 24 to 27 hours with the type of cure and period of cure depending on how long the composition has been stored, and whether a curing promoter was utilized, and the period of storage prior to cure. It should be noted that if the catalyst mixture is pre-reacted and the preferred tin soap is utilized in the instant case, then the composition will cure, with final cure taking place in 24 to 72 hours with the composition having a tight cure and have good physical properties.

The examples below are given for the purpose of illustrating the reduction to practice of the instant invention; they are not given for any purpose of setting limits and boundaries to the instant invention. All parts in the examples are by weight.

EXAMPLE 1

A base material was prepared comprising 100 parts of a silanol stopped methyl,3,3,3 trifluoropropylpolysiloxane having a viscosity of 100,000 centipoise at 25° C. To this was added nine parts of fumed silica filler and 10 parts of iron oxide. To 100 parts of the above mixture which shall hereinafter be referred to as Composition O, there was mixed 10 parts of the catalyst solution. The catalyst solution is set forth in Table I below.

TABLE I

| Catalyst Solution | A | B | C |
|---|---|---|---|
| Hexyltrisdimedonyl silane | 100 | 50 | 50 |
| Bis(3-trimethoxysilylpropyl)-maleate | — | 50 | — |
| 1,3,5-tris(3-trimethoxysilylpropyl)isocyanurate | — | — | 50 |
| Dibutyltindiacetate | 0.8 | 0.8 | 0.8 |

After the catalyst solutions were prepared prior to their being mixed into the base mixture, they were aged at 50° C. for 7 days. After the catalyst solution was mixed into Composition O there were prepared peal-adhesion samples which were allowed to cure for 10 days at 25° C. and at 50% relative humidity. Portions of the compounds were also placed in sealed metal tubes and stored at 50° C. and rechecked for adhesion as described below. The results are set forth in Table II below.

TABLE II

Adhesion Results of Dimedone Curing RTV

| Days at 50° C. | Compounds Containing Catalyst Solution | | |
|---|---|---|---|
| | A | B | C |
| 0 | Poor | Good | Fair |
| 15 | Poor | Good | Good |
| 30 | Poor | Good | Fair |

Good - 70-100% Cohesive Failure
Fair - 30-70% Cohesive Failure
Poor - 0-30% Cohesive Failure

EXAMPLE 2

The same base Composition O was utilized as in Example 1, and there was added to it 10 parts of catalyst Composition B except in this case the maleate concentration in the catalyst Composition B was varied from 20% to 80% as shown in Table III below. These catalyst solutions were aged at 50° C. for 7 days and mixed into the base compound and tested as described in Example 1. The results are set forth in Table III below.

TABLE III

| Ratio of the Maleate (%) in Catalyst Composition | 20 | 30 | 40 | 50 | 60 | 80 |
|---|---|---|---|---|---|---|
| Adhesion to anodized aluminum | Poor | Fair | Good | Good | Good | Good |
| Adhesion to Alclad aluminum | Fair | Fair | Good | Good | Good | Good |
| Adhesion to stainless steel (SS 304) | Good | Good | Good | Good | Good | Good |

EXAMPLE 3

A catalyst solution was prepared which contained 50 parts of hexyltris(dimedonyl)silane, 50 parts of bis-(3-trimethoxysilylpropyl) maleate, and 0.5 parts of dibutyltindiacetate. This mixture was heated at 50° C. for 7 days. An RTV was prepared by mixing 12 parts of this catalyst solution with 100 parts of Composition O of Example 1.

ASTM sheets and peel adhesion samples were prepared from the compounded material and cured for 14 days at 25° C. and 50% relative humidity. These samples were placed in jet fuel oil at room temperature and tested after 7 days and 14 days, respectively. The results are in Table IV below.

TABLE IV

| Properties | Days | | |
|---|---|---|---|
| | 0 | 7 | 14 |
| Shore A, hardness | 38 | 37 | 35 |
| Tensile strength (psi) | 224 | 181 | 186 |
| Elongation (%) | 165 | 146 | 153 |
| Volume swell (%) | — | +4.6 | +4.7 |
| Peel adhesion (ppi) (% C.F.) | | | |
| Anodized Al | 7.0(100) | 9.2(100) | 8.9(100) |
| Alclad Al | 8.9(100) | 9.9(100) | 9.2(100) |
| Stainless Steel | 11.2(100) | 9.6(80) | 9.2(60) |
| Steel | 6.6(70) | 2.0(0) | — |
| Copper | 3.0(0) | 1.5(0) | — |

This dimedone curing fluorosilicone rubber had almost no odor and no corrosion, and has good resistance against fuel oil. Also by incorporating the foregoing adhesion promoters at the rather high levels indicated in the above Examples, there was obtained good adhesion to the various substrates indicated in the Examples and particularly in this Example, Example 3. However, it is noted there was some metal surfaces in which the adhesion was marginal if not non-existent, such as for instance, copper. However, by the incorporation of the foregoing adhesion promoters and as indicated previously, there is obtained good adhesion to many metallic substrates, some plastic substrates, some glass and ceramic substrates.

EXAMPLE 4

To 100 parts of silanol end-stopped methyl, 3,3,3,-trifluoropropyl substituted polysiloxane polymer of the viscosity of 100,000 centipoise at 25° C. there was added 9 parts of fumed silica treated with methyl-3,3,3,trifluoropropylcyclotrisiloxane and 30 parts of iron oxide. To this Base Mixture Q there was added 10 parts of a freshly prepared catalyst solution. The catalyst solution comprised 50 parts of hexyltris(dimedonyl)silane, 50 parts of 1,3,5-tris(3-trimethoxysilylpropyl)isocyanurate and 0.8 parts of dibutyltindiacetate. A portion of the catalyzed compound was placed in metal tubes, sealed and stored at 50° C. Tubes were removed after 15 days and 30 days, respectively.

ASTM sheets were prepared from initial catalyzed compound and the aged compounds and cured for 10 days at 25° C. at 50% relative humidity. The cure material had the following properties:

TABLE V

| Days at 50° C. | 0 | 15 | 30 |
|---|---|---|---|
| Tack Free Time (minutes) | 40 | 60 | 120 |
| Shore A | 21 | 18 | 21 |
| Tensile Strength (psi) | 100 | 65 | 67 |
| Elongation (%) | 180 | 160 | 163 |

EXAMPLE 5

Ten parts of a catalyst solution described in Example 1 were aged at 50° C. for 7 days and mixed with 100 parts of Composition Q of Example 4. Then the catalyzed sample was stored for 0 days, for 15 days, and 30 days, respectively. The samples depending on when they were stored, were then taken and ASTM sheets were prepared from the initial catalyzed compound, the aged compounds, and cured for 10 days at 25° C. and 50% relative humidity. The cured material had the following physical properties as shown in Table VI below.

TABLE VI

| Days at 50° C. | 0 | 15 | 30 |
|---|---|---|---|
| Tack Free Time (minutes) | 60 | 120 | >120 |
| Shore A | 24 | 26 | 24 |
| Tensile Strength (psi) | — | — | — |
| Elongation (%) | 162 | 173 | 155 |

EXAMPLE 6

To 100 parts of the base Composition Q of Example 4 was added 10 parts of freshly prepared catalyst solution containing 50 parts of hexyltrisdimedonylsilane, 50 parts of bis(3-trimethoxysilylpropyl)-maleate adhesion promoter and 0.8 parts of dibutyltindiacetate. The compound material was stored and tested as described in Example 1. That is, three samples were prepared of material with catalyst solution in it which was cured to ASTM sheets immediately after mixing into base Composition Q. Then there were two other samples wherein the catalyst solution was mixed into the base Composition Q and the sample was stored for 15 days and then 30 days.

ASTM sheets were prepared from the initial catalyzed compound and the aged compound cured for 10 days at 25° C. at 50% relative humidity. The results are set forth in Table VII below.

TABLE VII

| Days at 50° C. | 0 | 15 | 30 |
|---|---|---|---|
| Tack Free Time (minutes) | 35 | 60 | 90 |
| Shore A | 22 | 13 | 15 |
| Tensile Strength (psi) | 154 | 52 | 51 |
| Elongation (%) | 200 | 165 | 159 |

EXAMPLE 7

A mixture of 50 parts of hexyltris(dimedonyl)silane, 50 parts of the maleate of Example 6 and 0.8 parts of dibutyltindiacetate was stored in a sealed jar at 50° C. for 7 days. Ten parts of this aged catalyst mixture was then added to 100 parts of Composition Q of Example 4 and the mixture was then taken and ASTM sheets were prepared from an initial catalyzed compound and a portion of the compound was also taken and aged for 15 days and 30 days. As noted, ASTM sheets were prepared from the initial catalyzed compound and the aged compounds and cured for ten days at 25° C. and 50% relative humidity. The results of both initial catalyzed composition and the stored composition are set forth in Table VIII below.

TABLE VIII

| Days at 50° C. | 0 | 15 | 30 |
|---|---|---|---|
| Tack Free Time (minutes) | 15 | 15 | 15 |
| Shore A | 36 | 37 | 37 |
| Tensile Strength (psi) | 207 | 223 | 221 |
| Elongation (%) | 119 | 133 | 139 |

As can be noted from the results above, the shelf stability of the composition is enhanced by heat-aging the catalyst, that is, the adhesion promoter with the cross-linking agent for various periods of time at 50° C., at any rate for 7 days at 50° C. By shelf stability is meant the composition immediately after being stored for prolonged amounts of time in a tube would have cured physical properties which are comparable to the cured physical properties after it is mixed with the catalyst mixture and cured initially. It should be noted that 30 days at 50° C. is commensurate to storing the composition for approximately 6 months at room temperature. Accordingly, by prereacting the cross-linking agent with adhesion promoter, the desired shelf stability in the composition is obtained and enhanced physical properties in the cured composition are obtained even after the composition has been stored for periods of time—as long as one year or more. Accordingly, by utilizing the foregoing adhesion promoters, the silyl maleate, silyl fumarate, silyl succinate, the silyl isocyanurate and silyl cyanurate as adhesion promoters with dimedonyl functional RTV systems and specifically with fluorosilicone dimedonyl RTV systems, there is obtained good adhesion to many substrates and specifically many metal substrates and by heat aging the catalyst solution with, that is, the adhesion promoter with a cross-linking agent with our without the curing promoter, the shelf stability of the composition is enhanced. The cured properties of the composition are maintained at a high level even after the composition has been stored for a period of time of one year or more.

What is claimed is:

1. A self-bonding one-component RTV silicone rubber composition comprising (A) 100 parts by weight of an organopolysiloxane consisting essentially of chemically combined units of the formula,

and having terminal alkoxysiloxy units of the formula,

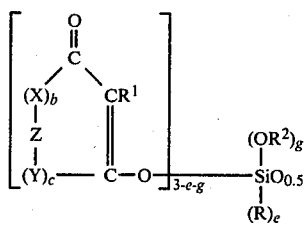

where R is a $C_{(1-13)}$ monovalent organic radical, $R^1$ is selected from hydrogen, halogen and R, $R^2$ is a $C_{(1-8)}$ alkyl radical, X and Y are divalent radicals selected from —O—, —S—, and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; (B) from 3 to 8 parts by weight of an adhesion promoter which is selected from the class consisting of silyl maleates, silyl fumarates, silyl succinates, silyl isocyanurates and mixtures thereof.

2. The composition of claim 1 where R is a mixture of methyl and 3,3,3, trifluoropropyl radicals.

3. The composition of claim 2 wherein the adhesion promoter is bis(3-trimethoxysilylpropyl) maleate.

4. The composition of claim 2 wherein the adhesion promoter is 1,3,5-tris(3-trimethoxysilylpropyl) isocyanurate.

5. The composition of claim 2 wherein the adhesion promoter is bis(3-trimethoxysilylpropyl) fumarate.

6. The composition of claim 1 wherein there is further present from 0.01 to 10 parts by weight of a curing promoter which is metal salt of a carboxylic acid.

7. The composition of claim 2 wherein the curing promoter is a tin salt.

8. The composition of claim 7 wherein the tin salt is dimethyl tin bis-neodecanoate.

9. The composition of claim 6 wherein the curing promoter is dibutyl tin diacetate.

10. The composition of claim 9 wherein there is present from 10 to 200 parts by weight of a filler.

11. The composition of claim 10 wherein the filler is fumed silica treated with cyclopolysiloxanes.

12. The composition of claim 11 wherein there is further present from 0 to 40 parts by weight of a first plasticizer which is a linear diorganopolysiloxane polymer of a viscosity varying from 10 to 20,000 centipoise at 25° C. and the organo group is a $C_{(1-8)}$ monovalent hydrocarbon radical.

13. The composition of claim 12 wherein there is further present from 0.2 to 10 parts by weight of a second plasticizer and adhesion promoter which is silanol containing diorganopolysiloxane with a viscosity in the range of 10 to 1000 centipoise at 25° C. where the organo group is a $C_{(1-8)}$ monovalent hydrocarbon radical and the silanol content varies from 3 to 10% by weight.

14. The composition of claim 1 wherein there is present from 1 to 10 parts of iron oxide as a thermal stabilizer.

15. A self-bonding one-component RTV silicone rubber composition comprising (A) 100 parts by weight of a silanol end-stopped polymer of the formula, $$HO \mathrm{-\!\!\!-\!\!\!-}\left[\begin{array}{c} R \\ | \\ SiO \\ | \\ R \end{array}\right]_s \mathrm{-\!\!\!-\!\!\!-} H$$

where s varies such that the viscosity of the polymer varies from 100 to 1,000,000 centipoise at 25° C. and the reaction product of (B) from 0.1 to 10 parts by weight of a silyl ether cross-linking agent of the formula, $$\left[\begin{array}{c} O \\ \| \\ (X)_b \diagup C \diagdown CR^1 \\ | \quad \| \\ Z \quad \| \quad (OR^2)_g \\ | \quad \| \quad | \\ (Y)_c \mathrm{-\!\!-} C \mathrm{-\!\!-} O \mathrm{-\!\!-}\!\!\!\!\!\!\!\!\!\!\!\Big]_{3-e-g} SiQ \\ \qquad\qquad\qquad | \\ \qquad\qquad\qquad (R)_e \end{array}\right]$$

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and $$\begin{array}{c} R^3 \\ | \\ -N- \end{array}$$

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; and (C) from 3 to 8 parts by weight of an adhesion promoter selected from the class consisting of silyl maleates, silyl fumarates, silyl succinates, silyl isocyanurates, and mixtures thereof.

16. The composition of claim 15 wherein the reaction product is formed by pre-reacting the cross-linking agent with the adhesion promoter at a temperature in the range of 40° C.-120° C.

17. The composition of claim 16 wherein the reaction product is formed by pre-reacting the cross-linking agent with adhesion promoter for a period of time varying from 2 hours to 10 days.

18. A composition of claim 17 wherein R is a mixture of methyl and 3,3,3-trifluoropropyl radicals.

19. The composition of claim 18 wherein the adhesion promoter is bis(3,trimethoxysilylpropyl) maleate.

20. The composition of claim 18 wherein the adhesive promoter is 1,3,5-tris(3-trimethoxysilylpropyl) isocyanurate.

21. The composition of claim 18 wherein the adhesion promoter is bis(3-trimethoxysilylpropyl) fumarate.

22. The composition of claim 17 wherein there is present from 1 to 10 parts by weight of iron oxide as a thermal stabilizer.

23. The composition of claim 15 wherein there is present from 0.01 to 10 parts by weight of a curing promoter which is a metal salt of a carboxylic acid.

24. The composition of claim 23 wherein the curing promoter is a tin salt.

25. The composition of claim 24 wherein the tin salt is a dimethyl tin bis-neodecanoate.

26. The composition of claim 24 wherein the tin salt is dibutyl tin diacetate.

27. The composition of claim 26 wherein there is present from 10 to 200 parts by weight of a filler.

28. The composition of claim 27 wherein the filler is fumed silica treated with cyclopolysiloxanes.

29. The composition of claim 28 where there is further present from 0 to 40 parts by weight of a first plasticizer which is a linear diorganopolysiloxane polymer of a viscosity varying from 10 to 20,000 centipoise at 24° C. and the organo group is a $C_{(1-8)}$ monovalent hydrocarbon radical.

30. The composition of claim 29 wherein there is further present from 1 to 20 parts by weight of a second plasticizer and an adhesion promoter which is silanol containing diorganopolysiloxane with a viscosity in the range of 10 to 1,000 centipoise at 25° C. where the organo group is a $C_{(1-8)}$ monovalent hydrocarbon radical and the silanol content varies from 3 to 10% by weight.

31. A self-bonding one-component RTV silicone rubber composition comprising (A) 100 parts by weight of a base organopolysiloxane consisting essentially of chemically combined units of the formula $$\begin{array}{c} R \\ | \\ -SiO-, \\ | \\ R \end{array}$$

and having terminal siloxy units of the formula, $$\left[\begin{array}{c} O \\ \| \\ (X)_b \diagup C \diagdown CR^1 \\ | \quad \| \\ Z \quad \| \quad (R^5)_d \\ | \quad \| \quad | \\ (Y)_c \mathrm{-\!\!-} C \mathrm{-\!\!-} O \mathrm{-\!\!-}\!\!\!\!\!\!\!\!\!\!\!\Big]_{3-d} SiO_{0.5} \end{array}\right]$$

where R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R and d is a whole number having a value of 0 or 1, $R^5$ is a $C_{(1-13)}$ monovalent organic radical, and (B) from 3 to 8 parts by weight of an adhesion promoter selected from a class consisting of silyl maleates, silyl fumarates, silyl succinates, silyl isocyanurates, and mixtures thereof.

32. A composition of claim 31 wherein R is a mixture of methyl and 3,3,3-trifluoropropyl radicals.

33. A composition of claim 32 wherein the adhesion promoter is bis(3-trimethoxysilylpropyl) maleate.

34. The composition of claim 32 wherein the adhesion promoter is 1,3,5-tris(3-trimethoxysilylpropyl) isocyanurate.

35. The composition of claim 32 wherein the adhesion promoter is bis(-3-trimethoxysilylpropyl) fumarate.

36. The composition of claim 31 wherein there is further present from 1 to 10 parts by weight of iron oxide as a heat stabilizer.

37. The composition of claim 31 wherein in the base organopolysiloxane, $R^5$ is a $C_{(4-12)}$ alkyl radical.

38. The composition of claim 37 where $R^5$ is a dodecyl radical.

39. The composition of claim 38 wherein there is further present from 0.01 to 10 parts by weight of a curing promoter which is a metal salt of carboxylic acid.

40. The composition of claim 39 wherein the curing promoter is dibutyl tin diacetate.

41. The composition of claim 39 wherein the curing promoter is a tin salt.

42. The composition of claim 41 wherein the tin salt is dimethyl tin bis-neodecanoate.

43. The composition of claim 42 wherein there is further present from 10 to 200 parts by weight of a filler.

44. The composition of claim 43 wherein this filler is fumed silica treated with cyclopolysiloxanes.

45. The composition of claim 44 wherein there is further present from 0 to 40 parts by weight of a first plasticizer which is a linear diorganopolysiloxane of a viscosity varying from 10 to 20,000 centipoise at 25° C. and the organo group is $C_{(1-8)}$ monovalent hydrocarbon radical.

46. The composition of claim 45 wherein there is further present from 1 to 20 parts by weight of a second plasticizer and an adhesion promoter which is silanol containing diorganopolysiloxane with a viscosity in the range of 10 to 1000 centipoise at 25° C. wherein the organo group is a $C_{(1-8)}$ monovalent hydrocarbon radical and the silanol content varies from 3 to 10% by weight.

47. A self-bonding one-component RTV silicone rubber composition comprising (A) 100 parts by weight of a silanol end-stopped polymer of the formula,

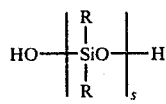

where s varies such that the viscosity of the polymer varies from 100 to 1,000,000 centipoise at 25° C. and the reaction product of (B) from 0.1 to 10 parts by weight of a silyl ether cross-linking agent of the formula,

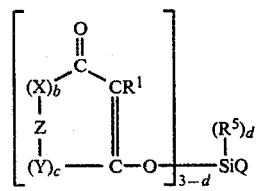

where Q is a hydrolyzable radical, R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 3 to 8 parts by weight of an adhesion promoter selected from the class consisting of silyl maleates, silyl fumarates, silyl succinates, silyl isocyanurates, and mixtures thereof.

48. The composition of claim 47 wherein the reaction product is formed by reacting the cross-linking agent with the adhesion promoter at a temperature in the range of 40°-120° C.

49. The composition of claim 48 wherein the reaction product is formed by reacting the cross-linking agent with the adhesion promoter for a period of time varying from 2 hours to 10 days.

50. The composition of claim 47 wherein R is a mixture of methyl and 3,3,-trifluoropropyl radicals.

51. The composition of claim 50 wherein the adhesion promoter is bis(3-trimethoxysilylpropyl) maleate.

52. The composition of claim 50 wherein the adhesion promoter is 1,3,5-tris(3-trimethoxysilylpropyl) isocyanurate.

53. The composition of claim 50 wherein the adhesion promoter is bis(3-trimethoxysilylpropyl) fumarate.

54. The composition of claim 50 wherein in the silyl ether cross-linking agent $R^5$ is a $C_{(4-12)}$ alkyl radical.

55. The composition of claim 54 wherein there is further present from 0.01 to 10 parts by weight of a curing promoter which is a metal salt of a carboxylic acid.

56. The composition of claim 55 wherein the curing promoter is a tin salt.

57. The composition of claim 56 wherein the curing promoter is dibutyl tin diacetate.

58. The composition of claim 57 wherein there is further present from 1 to 10 parts by weight of iron oxide as a thermal stabilizer.

59. The composition of claim 56 wherein the tin salt is dimethyl tin bis-neodecanoate.

60. The composition of claim 59 wherein there is further present from 10 to 200 parts by weight of a filler.

61. The composition of claim 60 wherein the filler is fumed silica treated with cyclopolysiloxanes.

62. The composition of claim 61 wherein there is further present from 0 to 40 parts by weight of a first plasticizer which is a linear diorganopolysiloxane polymer of a viscosity varying from 10 to 20,000 centipoise at 25° C. and the organo group is a $C_{(1-8)}$ monovalent hydrocarbon radical.

63. The composition of claim 62 wherein there is further present from 1 to 20 parts by weight of a second plasticizer and an additional adhesion promoter which is silanol containing diorganopolysiloxane with a viscosity in the range of 10 to 1,000 centipoise at 25° C. where the organo group is a $C_{(1-8)}$ monovalent hydrocarbon radical and the silanol content varies from 3 to 10% by weight.

64. A process for forming a self-bonding one-component RTV silicone rubber composition comprising (1) mixing (A) 100 parts by weight of a silanol end-stopped polymer of the formula,

where s varies such that the viscosity of the polymer varies from 100 to 1,000,000 centipoise at 25° C. with the reaction product of (B) from 0.1 to 10 parts by weight of a silyl ether cross-linking agent of the formula

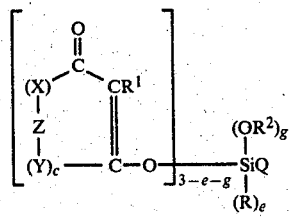

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; with (C) from 3 to 8 parts by weight of an adhesion promoter selected from the class consisting of silyl maleates, silyl fumarates, silyl succinates, silyl isocyanurates and mixtures thereof, and (2) allowing the composition to cure at room temperature.

65. The process of claim 64 wherein the reaction product is formed by reacting the cross-linking agent with the adhesion promoter at a temperature in the range of 40°–120° C.

66. The process of claim 65 wherein the reaction product is formed by reacting the cross-linking agent with the adhesion promoter for a period of time varying from 2 hours to 10 days.

67. The process of claim 66 wherein R is a mixture of methyl and 3,3,3-trifluoropropyl radicals.

68. The process of claim 67 wherein the adhesion promoter is bis(3-trimethoxysilylpropyl) maleate.

69. The process of claim 68 wherein the adhesion promoter is 1,3,5-tris(3-trimethoxysilylpropyl) isocyanurate.

70. The process of claim 68 wherein the adhesion promoter is bis(3-trimethoxysilylpropyl) fumarate.

71. A process for forming self-bonding one-component RTV silicone rubber composition comprising (1) mixing (A) 100 parts by weight of a silanol end-stopped polymer of the formula,

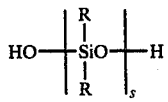

where s varies such that the viscosity of the polymer varies from 100 to 1,000,000 centipoise at 25° C., with the reaction product of (B) from 0.1 to 10 parts by weight of a silyl ether cross-linking agent of the formula,

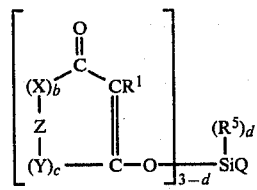

where Q is a hydrolyzable radical, R is a $C_{(1-13)}$ monovalent organic radical, $R^1$ is selected from hydrogen, halogen, and R, X, and Y are divalent radicals selected from —O—, —S— and

Z is a divalent $C_{(1-13)}$ organic radical selected from alkylene, cyclalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; with (C) from 3 to 8 parts by weight of an adhesion promoter selected from the class consisting of silyl maleates, silyl fumarates, silyl succinates, silyl isocyanurates and mixtures thereof, and (2) allowing the composition to cure at room temperature.

72. The process of claim 71 wherein the silyl ether cross-linking agent, $R^5$ is a $C_{(4-12)}$ alkyl radical.

73. The process of claim 72 where $R^5$ is a dodecyl radical.

74. The process of claim 73 wherein the reaction product is formed by pre-reacting the cross-linking agent with the adhesion promoter at a temperature in the range of 40° to 120° C.

75. The process of claim 74 wherein the reaction product is formed by pre-reacting the cross-linking agent with the adhesion promoter for a period of time varying from 2 hours to 10 days.

76. The process of claim 75 wherein R is a mixture of methyl and 3,3,3-trifluoropropyl radicals.

77. The process of claim 76 wherein the adhesion promoter is bis(3-trimethoxysilylpropyl)maleate.

78. The process of claim 76 wherein the adhesion promoter is 1,3,5-tris(3-trimethoxysilylpropyl)isocyanurate.

79. The process of claim 76 wherein the adhesion promoter is bis(3-trimethoxysilylpropyl)fumarate.

80. An article of manufacture comprising a laminate of a metallic substrate and a one-component self-bonding RTV silicone rubber composition, comprising, (1) a metallic substrate and (2) having thereover a layer of self-bonding one-component RTV silicone rubber composition having (A) 100 parts by weight of an organopolysiloxane consisting essentially of chemically combined units of the formula,

and having terminal alkoxysiloxy units of the formula,

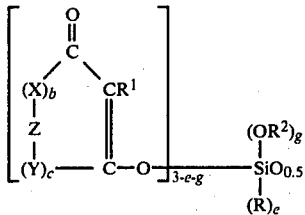

where R is a $C_{(1-13)}$ monovalent organic radical, $R^1$ is selected from hydrogen, halogen and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and fused ring structure, b and c are equal to 0 or 1, $R^3$ is selected from hydrogen and R, e is a whole number having a value of 0 or 1, g is equal to 1 or 2, and the sum of e+g is equal to 1 or 2; (B) from 3 to 8 parts by weight of an adhesion promoter selected from the class consisting of silyl maleates, silyl fumarates, silyl succinates, silyl isocyanurates and mixtures thereof.

81. The laminate of claim 80 wherein there is further present from 0.01 to 10 parts by weight of a curing promoter which is a metal salt of carboxylic acid.

82. A laminate of claim 81 wherein R is selected from a mixture of methyl and 3,3,3-trifluoropropyl radicals.

83. The laminate of claim 82 wherein the adhesion promoter is bis(3-trimethoxysilylpropyl)maleate.

84. The laminate of claim 82 wherein the adhesion promoter is 1,3,5-tris(3-trimethoxysilylpropyl)isocyanurate.

85. The laminate of claim 82 wherein the adhesion promoter is bis(3-trimethoxysilylpropyl)fumarate.

86. A laminate of a substrate and a silicone rubber composition comprising (1) a metallic substrate and (2) a layer over said substrate of a self-bonding one-component RTV silicone rubber composition having (A) 100 parts by weight of a silanol end-stopped polymer of the formula.

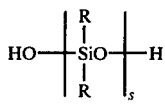

where s varies such that the viscosity of the polymer varies from 100 to 1,000,000 centipoise at 25° C., with the reaction product of (B) from 0.1 to 10 parts by weight of a silyl ether cross-linking agent of the formula,

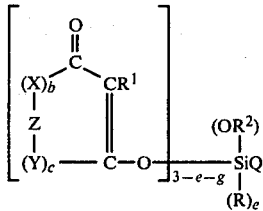

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; and (C) from 3 to 8 parts by weight of an adhesion promoter selected from the class consisting of silyl maleates, silyl fumarates, silyl succinates, silyl isocyanurates and mixtures thereof.

87. The laminate of claim 86 where it is further present from 0.01 to 10 parts by weight of a curing promoter which is a metal salt of a carboxylic acid.

88. The laminate of claim 87 where the reaction product is formed by pre-reacting the cross-linking agent with the adhesion promoter at a temperature in the range of 40°–120° C.

89. The laminate of claim 88 wherein the reaction product is formed by pre-reacting the cross-linking agent with the adhesion promoter for a period of time varying from 2 hours to 10 days.

90. The laminate of claim 89 wherein R is a mixture of methyl and 3,3,3-trifluoropropyl radicals.

91. The laminate of claim 90 wherein the adhesion promoter is bis(3-trimethoxysilylpropyl)maleate.

92. The process of claim 90 wherein the adhesion promoter is 1,3,5-tris(3-trimethoxysilylpropyl)isocyanurate.

93. The process of claim 90 wherein the adhesion promoter is bis(3-trimethoxysilylpropyl)fumarate.

94. A laminate of a substrate and a silicone elastomer comprising (1) a metallic substrate and (2) applied over the substrate a layer of self-bonding one-component RTV silicone rubber composition having (A) 100 parts by weight of an organopolysiloxane consisting essentially of chemically combined units of the formula,

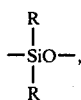

and having terminal siloxy units of the formula,

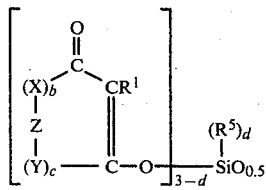

where R is a $C_{(1-13)}$ monovalent organic radical, $R^1$ is selected from hydrogen, halogen and R, X, and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical, and (B) from 3 to 8 parts by weight of an adhesion promoter selected from the class consisting of silyl maleates, silyl fumarates, silyl succinates, silyl isocyanurates and mixtures thereof.

95. The composition of claim 94 wherein the base organopolysiloxane $R^5$ is a $C_{(4-12)}$ alkyl radical.

96. The laminate of claim 95 wherein there is further present from 0.01 to 10 parts by weight of a curing promoter which is a metal salt of a carboxylic acid.

97. The laminate of claim 96 where R is selected from a mixture of methyl and 3,3,3-trifluoropropyl radicals.

98. The laminate of claim 96 where the adhesion promoter is bis(3-trimethoxysilylpropyl)maleate.

99. The laminate of claim 96 wherein the adhesion promoter is 1,3,5-tris(3-trimethoxysilylpropyl)isocyanurate.

100. The laminate of claim 96 wherein the adhesion promoter is bis(3-trimethoxysilylpropyl)fumarate.

101. A laminate of a substrate and a silicone elastomer comprising (1) a metallic substrate and (2) applied over the substrate is layer of a self-bonding one-component RTV silicone rubber composition having (A) 100 parts by weight of a silanol end-stopped polymer of the formula,

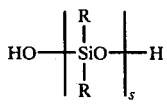

where s varies such that the viscosity of the polymer varies from 100 to 1,000,000 centipoise at 25° C., with the reaction product of (B) from 0.1 to 10 parts by weight of a silyl ether cross-linking agent of the formula,

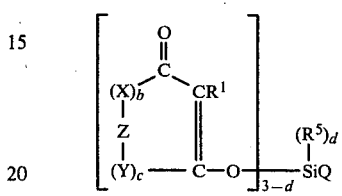

where Q is a hydrolyzable radical, R is a $C_{(1-13)}$ monovalent organic radical, $R^1$ is selected from hydrogen, halogen and R, X and Y are divalent radicals selected from —O—, —S— and

z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 3 to 8 parts by weight of an adhesion promoter selected from the class consisting of silyl maleates, silyl fumarates, silyl succinates, silyl isocyanurates and mixtures thereof.

102. The laminate of claim 101 wherein in the silyl ether cross-linking agent, $R^5$ is a $C_{(4-12)}$ alkyl radical.

103. The laminate of claim 102 where $R^5$ is a dodecyl radical.

104. The laminate of claim 101 wherein there is further present from 0.01 to 10 parts by weight of a curing promoter which is a metal salt of a carboxylic acid.

105. A laminate of claim 101 wherein the reaction product is formed by pre-reacting the cross-linking agent with adhesion promoter at a temperature range of 40° to 120° C.

106. The laminate of claim 105 wherein the reaction product is formed by pre-reacting the cross-linking agent with adhesion promoter for a period of time varying from 2 hours to 10 days.

107. The laminate of claim 102 where R is a mixture of methyl and 3,3,3-trifluoropropyl radicals.

108. The laminate of claim 102 where the adhesion promoter is bis(3-trimethoxysilylpropyl)maleate.

109. The laminate of claim 102 wherein the adhesion promoter is 1,3,5-tris(3-trimethoxysilylpropyl)isocyanurate.

110. The laminate of claim 102 wherein the adhesion promoter is bis(3-trimethoxysilylpropyl)fumarate.

* * * * *